United States Patent
Jöngren et al.

(10) Patent No.: US 8,644,415 B2
(45) Date of Patent: Feb. 4, 2014

(54) METHOD FOR PRECODING USING A BLOCK DIAGONAL MATRIX

(75) Inventors: George Jöngren, Stockholm (SE); Bo Göransson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 929 days.

(21) Appl. No.: 12/522,863

(22) PCT Filed: Dec. 21, 2007

(86) PCT No.: PCT/SE2007/051070
§ 371 (c)(1),
(2), (4) Date: Jul. 10, 2009

(87) PCT Pub. No.: WO2008/085107
PCT Pub. Date: Jul. 17, 2008

(65) Prior Publication Data
US 2010/0046650 A1     Feb. 25, 2010

(30) Foreign Application Priority Data
Jan. 12, 2007  (SE) .................................. 0700065

(51) Int. Cl.
*H04B 15/00*  (2006.01)
*H04B 7/216*  (2006.01)
*H03C 7/02*  (2006.01)

(52) U.S. Cl.
USPC ........................... 375/285; 370/342; 455/101

(58) Field of Classification Search
USPC ........................................ 375/285; 370/342
See application file for complete search history.

(56) References Cited

U.S. PATENT DOCUMENTS 6,563,812 B1 *  5/2003  De ................................ 370/342
6,563,880 B1 *  5/2003  Hunsinger et al. ............ 375/260
(Continued)

FOREIGN PATENT DOCUMENTS

| EP | 2415863 A | 1/2006 |
| JP | 2005236686 A | 9/2005 |
| WO | 2006/049417 A1 | 5/2006 |
| WO | WO2006049417 | * 5/2006 |

OTHER PUBLICATIONS

Takatori, Y. et al., "Downlink Beamforming Method for SDMA Smart Antennas in Multipath Fading Environments," Technical report of IEICE, Feb. 22, 2002, Chapter 2, RCS2001-305, Japan.

(Continued)

*Primary Examiner* — Leon-Viet Nguyen
*Assistant Examiner* — Sarah Hassan
(74) *Attorney, Agent, or Firm* — Coats and Bennett, P.L.L.C.

(57) ABSTRACT

An objective problem of the invention is to provide a mechanism for improving the performance of a radio access network. According to a first aspect of the present invention, the object is achieved by a method in a first node for adapting a multi-antenna transmission to a second node over an effective channel. The first node and the second node are comprised in a wireless communication system. The method comprises the steps of obtaining at least one symbol stream and determining a precoding matrix having a block diagonal structure. The method comprises the further steps of precoding the at least one symbol stream with the determined precoding matrix, and transmitting the at least one precoded symbol stream over the effective channel to the second node.

44 Claims, 3 Drawing Sheets

700 Second node arrangement

(56) References Cited

U.S. PATENT DOCUMENTS

| | | | |
|---|---|---|---|
| 2003/0112887 A1* | 6/2003 | Sang et al. | 375/285 |
| 2006/0193294 A1* | 8/2006 | Jorswieck et al. | 370/334 |
| 2007/0254607 A1* | 11/2007 | Bandemer et al. | 455/101 |
| 2008/0049709 A1* | 2/2008 | Pan et al. | 370/344 |
| 2008/0080632 A1* | 4/2008 | Kim et al. | 375/267 |
| 2008/0080634 A1* | 4/2008 | Kotecha et al. | 375/267 |
| 2008/0192856 A1* | 8/2008 | Jongren et al. | 375/267 |

OTHER PUBLICATIONS

Tsuruta, M. et al., "Propagation Channel Modeling for MIMO Space and Polarization Domains Data Transmission," Technical report of IEICE, Sep. 4, 2003, Chapter 2, AP2003-143, Japan.

Toshima, K. et al., "A Consideration on Quasi-Orthogonal MIMO-STBC Transmission System Using Orthogonal Polarized Waves," Technical report of IEICE, Jul. 13, 2005, Chapter 2, AP2005-57, Japan.

Shen, Z. et al. "Low Complexity User Selection Algorithms for Multiuser MIMO Systems with Block Diagonalization." IEEE Transactions on Signal Processing, vol. 54, No. 9, Sep. 2006, pp. 3658-3663.

3rd Generation Partnership Project. "Codebook Design for E-UTRA MIMO Pre-coding." 3GPP TSG RAN WG1 46bis, R1-062650, Oct. 9-13, 2006, Seoul, Korea.

3rd Generation Partnership Project. "On the use of pre-coding in E-UTRA." 3GPP TSG RAN WG1 #47, R1-063129, Nov. 6-10, 2006, Riga, Latvia.

Lee, W. et al. "Polarization Diversity System for Mobile Radio." IEEE Transactions on Communications, vol. COM-20, No. 5, Oct. 1972, pp. 912-923.

* cited by examiner

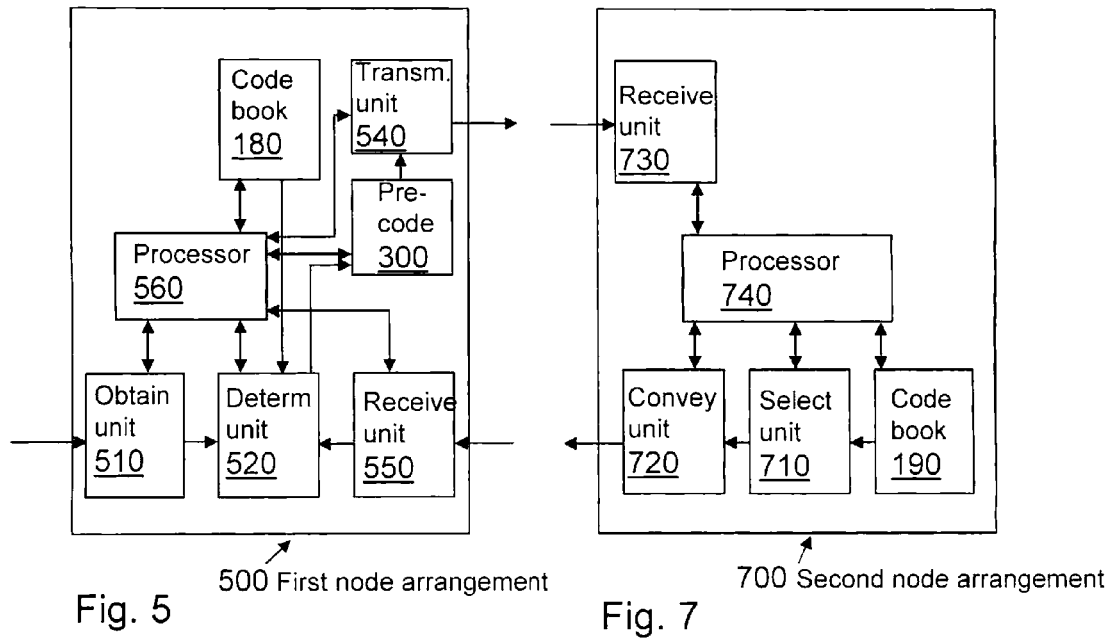
Fig. 5 — 500 First node arrangement
Fig. 7 — 700 Second node arrangement
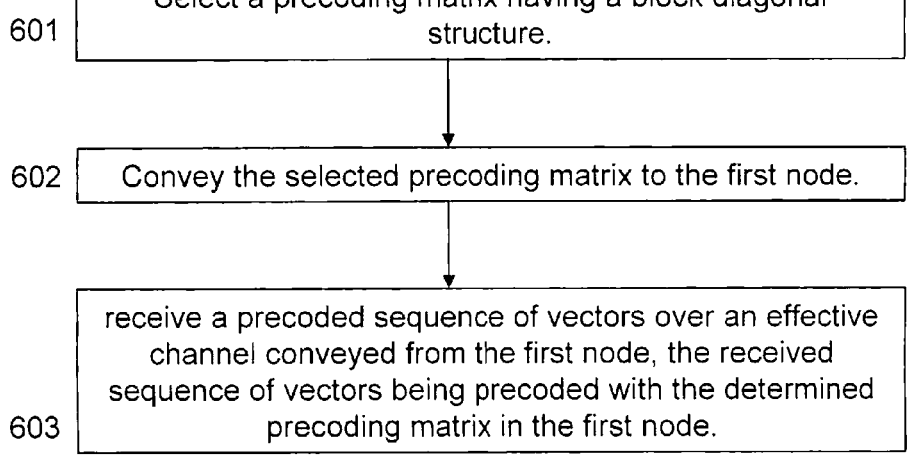
Fig. 6

METHOD FOR PRECODING USING A BLOCK DIAGONAL MATRIX

TECHNICAL FIELD

The present invention relates to a method and an arrangement in a first node and a method and an arrangement in a second node. In particular, it relates to adaptation of a multi-antenna transmission from the first node to the second node over an effective channel.

BACKGROUND

The use of multiple antennas at a transmitter and/or a receiver of a node in a wireless communication system may significantly boost the capacity and coverage of the wireless communication system. Such Multiple Input Multiple Output (MIMO) systems exploit the spatial dimension of the communication channel to improve performance by for example transmitting several parallel information carrying signals, so-called spatial multiplexing. By adapting the transmission to the current channel conditions, significant additional gains may be achieved. One form of adaptation is to dynamically, from one Transmission Time Interval (TTI) to another, adjust the number of simultaneously transmitted information carrying signals to what the channel may support. This is commonly referred to as transmission rank adaptation. Precoding is another related form of adaptation where the phases and amplitudes of the aforementioned signals are adjusted to better fit the current channel properties. Classical beam-forming is a special case of precoding in which the phase of an information-carrying signal is adjusted on each transmit antenna so that all the transmitted signals add constructively at the receiver.

The signals form a vector-valued signal and the adjustment may be thought of as multiplication by a precoder matrix. The precoder matrix is chosen based on information about the channel properties. A common approach is to select the precoder matrix from a finite and countable set, a so-called codebook. Such codebook based precoding is an integral part of the Long Term Evolution LTE standard and will be supported in MIMO for High Speed Downlink Packet Access (HSDPA) in Wideband Code Division Multiple Access (WCDMA) as well. The receiver (e.g. User Equipment, UE) would then typically evaluate all the different precoder matrices in the codebook and signal to the transmitter (e.g. Node B) which element is preferred. The transmitter would then use the signalled information, when deciding which precoder matrix to apply. Since codebook indices need to be signalled and the receiver needs to select a suitable codebook element, it is important to keep the codebook size as small as possible. On the other hand, larger codebooks ensure that it is possible to find an entry that matches the current channel conditions more closely.

Codebook based precoding may be seen as a form of channel quantization. Alternatively, methods may be used that compute the precoder matrix without resorting to quantization.

The fundamental goal of precoder codebook design is to keep the codebook size small while still achieving as high performance as possible. Design of the elements in the codebook thus becomes crucial in order to achieve the intended performance.

Different antenna array configurations influence how the codebook elements should be designed. Many existing solutions are designed with spatially uncorrelated channel fading in mind and where each channel coefficient fades with the same average power. However, such a channel model is not sufficiently accurate when cross-polarized antenna arrays are used. Consequently, the existing designs are ill-suited for such a configuration—an antenna configuration which is deemed important in practice.

To understand why existing designs tailored for equal powered channel coefficients are not efficient for a cross-polarized antenna array setup, consider for simplicity a 2×2 MIMO system in which both the transmitter and the receiver use cross-polarized arrays and the two orthogonal polarizations are aligned on the transmit and receive side, e.g. a pair of vertically and horizontally polarized antennas on both sides of the link. The MIMO channel matrix will then be diagonally heavy, meaning that the on-diagonal elements on average have substantially more power than the off-diagonal ones, since the vertical and horizontal polarizations are on average fairly well-separated even after experiencing the radion channel and reaching the receiver. For such a channel, an appropriate codebook of minimal size contains the unit vectors and the identity matrix. This ensures that when one-stream transmission (rank-one transmission) is performed, all the transmit power may be allocated to the antenna with the strong channel and no power is wasted on the other antenna, which on average will not be able to convey significant power to the receiver. The reason for the latter is because of the cross-polarized setup in conjunction with the selection of rank-one transmission, which means the channel matrix will typically have only one element with a power substantially larger than zero and that element will lie on the diagonal.

All power should hence be allocated to the antenna which corresponds to the aforementioned non-zero diagonal element. For a design which targets a scenario with equal powered channel coefficients, this is however typically not the case. Existing codebook designs do however not address this issue for the case of more than two antennas and also do not consider the structure of the codebook for various transmission ranks.

SUMMARY

The objective problem is to provide a mechanism for improving the performance of a radio link when the effective channel is intentionally of a block diagonal structure.

According to a first aspect of the present invention, the object is achieved by a method in a first node for adapting a multi-antenna transmission to a second node over an effective channel. The effective channel has multiple inputs and at least one output. The first node and the second node are comprised in a wireless communication system. The method comprises the steps of obtaining at least one symbol stream, and determining a precoding matrix having a block diagonal structure. The method comprises the further steps of precoding the at least one symbol stream with the determined precoding matrix, and transmitting the at least one precoded symbol stream over the effective channel to the second node.

According to a second aspect of the present invention, the object is achieved by a method in a second node for assisting a first node in the adaptation of a multi-antenna transmission from the first node to the second node over an effective channel. The effective channel has multiple inputs and at least one output. The first node and the second node are comprised in a wireless communication system. The method comprises the steps of selecting a precoding matrix having a block diagonal structure, and conveying the selected precoding matrix to the first node. The method comprises the further step of receiving at least one precoded symbol stream over the effective channel conveyed from the first node. The received at least one symbol stream is precoded with the determined precoding matrix in the first node.

According to a third aspect of the present invention, the object is achieved by an arrangement in a first node. The first node is arranged to adapt a multi-antenna transmission to a second node over an effective channel. The effective channel has multiple inputs and at least one output. The first node and the second node are comprised in a wireless communication system. The first node arrangement comprises an obtaining unit configured to obtain at least one symbol stream, and a determination unit configured to determine a precoding matrix having a block diagonal structure. The first node arrangement further comprises a precoding unit configured to precode the at least one symbol stream with the determined precoding matrix, and a transmission unit configured to transmit the at least one precoded symbol stream over the effective channel to the second node.

According to a fourth aspect of the present invention, the object is achieved by an arrangement in a second node. The second node is arranged to receive a multi-antenna transmission from a first node a over an effective channel. The effective channel has multiple inputs and at least one output. The first node and the second node are comprised in a wireless communication system. The second node arrangement comprises a selecting unit configured to select a precoding matrix having a block diagonal structure, and a conveying unit configured to convey the selected precoding matrix to the first node. The second node arrangement further comprises a receiving unit configured to receive at least one precoded symbol stream over the effective channel transmitted from the first node. The received at least one symbol stream is precoded with the determined precoding matrix in the first node.

The advantage by using a precoding matrix having a block diagonal structure for precoding is that when the effective channel matrix is block diagonal, the use of the precoding matrix having a block diagonal structure adapts the transmission to the block diagonal effective channel matrix, implying that the performance of the radio link is improved.

Advantages of the present invention comprise increases of performance of the system such as e.g. bit-rate and/or coverage, at a fixed codebook size or, alternatively, decreasing codebook size and thus reducing signalling overhead and complexity of precoder matrix selection. The presence of zero-elements in the precoder matrices may also help in reducing the complexity even further when performing precoder selection. Such block diagonal precoder designs do raise the performance when cross-polarized antenna setups are present.

BRIEF DESCRIPTION OF THE DRAWINGS

The invention is described in more detail with reference to attached drawings illustrating exemplary embodiments of the invention and in which:

FIG. 5 is a schematic block diagram illustrating embodiments of a first node arrangement.

FIG. 6 is a flow chart illustrating embodiments of a method in a second node.

FIG. 7 is a schematic block diagram illustrating embodiments of a second node arrangement.

DETAILED DESCRIPTION

The invention is defined as a method and an arrangement which may be put into practice in the embodiments described below.

Figure 1:
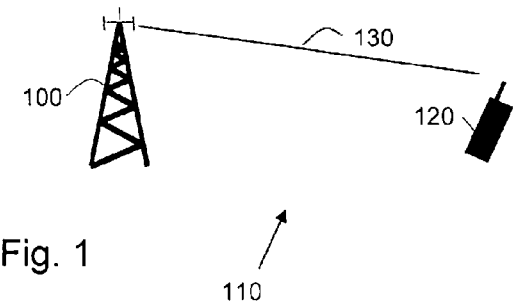
FIG. 1 is a schematic block diagram illustrating embodiments of a wireless communication system.

FIG. 1 depicts a first node 100 in a wireless communication system 110. The wireless communication system 110 may be a cellular system and/or a system such as e.g. Long Term Evolution (LTE), Evolved—Universal Terrestrial Radio Access (E-UTRA), Worldwide Interoperability for Microwave Access (WiMAX), Universal Terrestrial Radio Access (UTRA), Wideband Code Division Multiple Access (WCDMA), GSM, Ultra Mobile Wideband (UMB) or any other wireless communication system using technologies that perform adaptation between different forms of transmission and use multiple antennas. The first node 100 is arranged to communicate with a second node 120 in the wireless communication system 110 over an effective channel 130. The effective channel typically does not only comprise a physical multi-antenna radio channel. It may also comprise parts of the Radio Frequency (RF) and base band parts in the first node 100 and the second node 120 such as transmit and receive filters, feeder cables, antenna responses and various digital and analog filters in the base band processing. A linear and time-invariant MIMO filter may be used to model the input-output relation of the effective channel. For sufficiently narrowband transmissions, a single matrix may be used for describing the filter. Such a channel matrix description also holds for modelling the channel over a subcarrier, (or several subcarriers as long they span a bandwidth which is small compared with the coherence bandwidth of the channel) in an Orthogonal Frequency Division Multiplexing (OFDM) system such as e.g. LTE. The first node 100 may be any type of base station such as e.g. a NodeB as in LTE. The second node 120 may be a user equipment (UE) such as e.g. a mobile phone, a Personal Digital Assistant (PDA), a laptop. It may also be the other way around, that the first node 100 may be a UE such as e.g. a mobile phone, a Personal Digital Assistant (PDA) and the second node 120 may be any type of a base station such as e.g. a NodeB. In the example of FIG. 1, the first node 100 is a base station and the second node 120 is a user equipment. In addition, the first node 100 and the second node 120 may constitute arbitrary wireless devices in communication with each other and with no particular hierarchical ordering.

Figure 2:
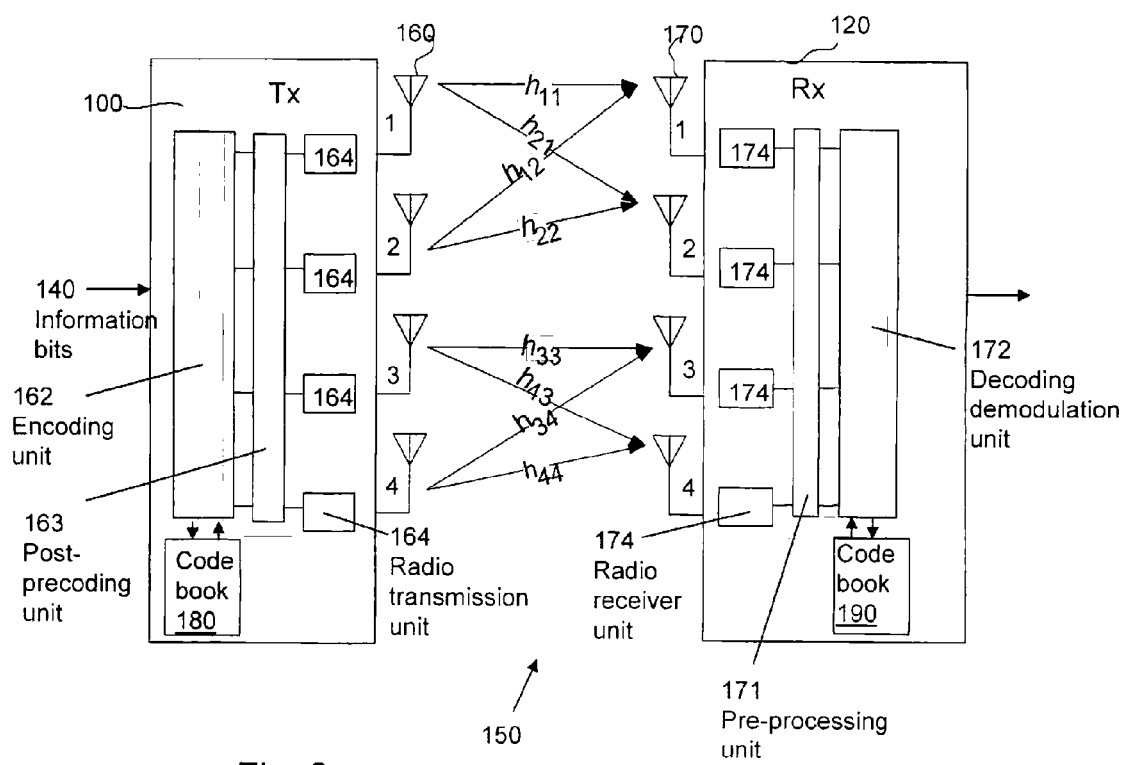
FIG. 2 is a schematic block diagram illustrating embodiments of a wireless communication system.

The first node 100 uses a multiple antenna system, i.e. uses multiple antennas for its transmission to the second node 120. The second node 120 may also use a multiple antenna system for reception of the first node's transmission. This is thus a MIMO system, which includes the special case of only one receive antenna. FIG. 2 illustrates some embodiments wherein the first node 100 and a second node 120 are each using a multiple antenna system comprising four antennas. Referring to FIG. 2, the first node 100 obtains an information carrying signal 140 being represented by a sequence of information bits, which information is to be conveyed to the second node 120 over the effective channel 130 FIG. 2 schematically illustrates the first node 100 as being the transmitting node (Tx) and the second node 120 as being the receiving node (Rx), the first node 100 and the second node 120 may use a multiple-antenna system 150, resulting in a MIMO link. In this example the first node 100 comprises four transmit antennas 160 1, 2, 3 and 4, e.g. a base station with four transmit antennas, and the second node 120 comprises four receive antennas 170 1, 2, 3 and 4, e.g. a user equipment with four receive antennas.

In the example of FIG. 2, the first node 100 comprises an encoding unit 162, a post precoding unit 163 and four radio transmitter units 164. The encoding unit 162 is arranged to receive the information carrying signal 140 to be transmitted. The encoding unit 162 may further be arranged to possibly demultiplex the information bits into one or several information bit sequences, code these information bit sequences using some channel code (e.g. turbo code, LDPC code, convolutional code), modulate the coded bits to produce symbols, map the symbols to a sequence of information carrying symbol vectors and precode the information carrying symbol vectors and finally forward the result to a possible post precoding unit 163. The post-precoding unit may in the simplest of cases just forward the precoded signal or it might process it in some way, e.g. perform digital filtering in baseband, before outputting possibly processed signals for transmission utilizing the radio transmitter units 164, using the respective transmit antennas 160 1, 2, 3 and 4 for transmitting the precoded signal to the second node 120. It is appreciated that the basic functions of the transmitter are well known for a skilled person and not described in detail. The transmitter in this example may support techniques such as SDMA, SDMA precoding, MIMO, MIMO precoding, and/or MIMO-SDMA.

In the example of FIG. 2, the second node 120 comprises a pre-processing unit 171, a decoding demodulation unit 172 and four radio receiver units 174. The second node is arranged to receive from the first node 100, the precoded signal by means of the receive antennas 1701, 2, 3 and 4, the pre-processing unit 171 and the radio receiver units 174. The pre-processing unit 171 may implement various processing steps that are not dependent on which precoder matrix is being used for the transmission, e.g. it may perform filtering in base band or simply forward the signals unaltered to the decoding demodulation unit 172. In the latter case, the pre-processing unit 171 may alternatively be considered not to be present. The decoding demodulation unit 172 may be arranged to receive the coded signal from the pre-processing unit 171. The decoding demodulation unit 172 may further be arranged to demodulate the coded signal to data bits. It is appreciated that the basic functions of the receiver are well known for a skilled person and not described in detail herein.

It should also be noticed that both receiver in the second node 120 and transmitter in the first node 100 may alter operation mode functioning as transmitter and receiver, respectively.

Precoding

Figure 3:
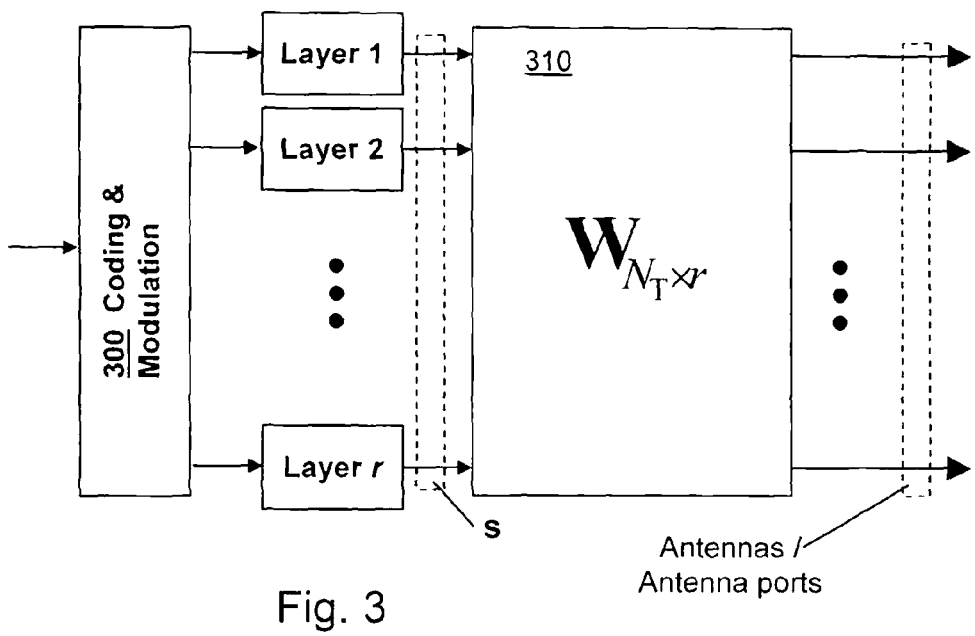
FIG. 3 is a schematic block diagram illustrating embodiments of a first node.

As already indicated, the encoding unit 162 in the first node 100 can be further subdivided into two parts, corresponding to a coding and modulation unit 300 and a precoding unit 310, such as e.g. a precoder. An example of a coding and modulation unit 300 and a precoding unit 310 is depicted in FIG. 3. The coding and modulation unit takes information bits as input and produces a sequence of information carrying symbol vectors, i.e. a vector-valued information-carrying signal as output. The information carrying symbol vectors can be seen as one or several symbol streams in parallel where each element of each vector s thus belongs to a certain symbol stream. The different symbol streams are commonly referred to as layers and at any given moment there are r different such layers corresponding to a transmission rank of r. Thus, the signal to be transmitted to the second node 120 over the effective channel 130 comprises at least one symbol stream (or layer). The r symbols in a particular r×1 information carrying symbol vector s is subsequently multiplied by an $N_T \times r$ precoder matrix $W_{N_T \times r}$, where $N_T$ denotes the number of inputs (e.g. number of transmit antennas, number of antenna ports etc) of the effective channel. Hence, the mentioned precoding operation forwards the resulting output to the post-processing unit 163 and the post-processing unit 163 can thus be considered to be part of the effective channel. The first node 100 determines a precoding matrix having a block diagonal structure, which will be further described below. This may be performed by choosing a precoding matrix to match the characteristics of the effective channel, i.e., to match an $N_R \times N_T$ MIMO effective channel matrix H. The precoder matrix $W_{N_T \times r}$ may thus depend on the value of the effective channel H. The r information carrying symbols in s are typically complex-valued. Support of rank adaptation allows the number of simultaneously transmitted symbol streams, r, to be set to suit the current channel characteristics. Subsequent to precoding, the signals are conveyed over the effective channel H and received by an antenna array with $N_R$ elements. The receiver possibly processes the signals by means of the pre-processing unit 171. Neither the post-processing unit 163 nor the pre-processing unit 171 typically introduces processing in the spatial domain that depends on the instantaneous channel conditions as determined by the fast fading introduced by the physical channel. Collecting the signals into an $N_R \times 1$ vector y and considering the signals over a sufficiently narrow bandwidth, compared with the coherence bandwidth of the effective channel, gives the model $$y = H W_{N_T \times r} s + e$$

where e is usually modelled as a noise vector obtained as realizations of some random process and where the output of the effective channel thus corresponds to the output of pre-processing unit 171 (the latter which may be transparent). This model obviously also holds for OFDM systems (e.g. LTE, WiMaX etc) where it typically can be applied on a subcarrier basis.

Effective Channel Matrix, H

Referring again to FIG. 2 the first node 100 comprises a multi-antenna system where at least one antenna emits radio waves in a certain polarization direction and at least one other antenna emits energy in the orthogonal polarization direction. Such a dual-, or cross-, polarized antenna setup may thus contain a group of co-polarized antennas and another group of co-polarized antennas orthogonally polarized relative the former group. "Co-polarization" means the antennas are transmitting with the same polarization. Under ideal line-of-sight conditions, assuming ideal antenna responses and a similar dual-polarized antenna setup at the receive side, the cross-polarized antenna set-up results in a block diagonal effective channel matrix, which will be further explained below. In the example of FIG. 2, the first two transmit antennas 160, 1 and 2, are horizontally polarized and the remaining two, 3 and 4, are vertically polarized. The co-polarized antennas in the transmit array may be spaced sufficiently far apart so that the fading is roughly uncorrelated. As mentioned above, the effective channel may be modelled using an effective channel matrix. Without loss of generality, by appropriately reordering the transmit and receive antenna elements, the 4×4 effective channel matrix H, then tends to have the block-diagonal structure according to:

$$H = \begin{bmatrix} h_{11} & h_{12} & 0 & 0 \\ h_{21} & h_{22} & 0 & 0 \\ 0 & 0 & h_{33} & h_{34} \\ 0 & 0 & h_{43} & h_{44} \end{bmatrix}$$

With such a block-diagonal effective channel matrix, signals transmitted on antennas 160 1 and 2 in the first node 100, do not reach receive antennas 170 3 and 4, and, correspondingly, signals from transmit antennas 160 3 and 4 do not reach receive antennas 170 1 and 2. This implies, as depicted in FIG. 2, for the first two transmit antennas 160, 1 and 2 being horizontally polarized that the complex-valued channel coefficient $h_{11}$ represents the effective channel involving the physical channel between transmit antenna 160 1 and receive antenna 170 1, the complex-valued channel coefficient $h_{12}$ represents the effective channel involving the physical channel between transmit antenna 160 2 and receive antenna 170 1, the complex-valued channel coefficient $h_{21}$ represents the effective channel involving the physical channel between transmit antenna 160 1 and receive antenna 170 2, the complex-valued channel coefficient $h_{22}$ represents the effective channel involving the physical channel between transmit antenna 160 2 and receive antenna 170 2.

This further implies, as depicted in FIG. 2, for the remaining two transmit antennas 160, 3 and 4 being vertically polarized that the complex-valued channel coefficient $h_{33}$ represents the effective channel involving the physical channel between transmit antenna 160 3 and receive antenna 170 3, the complex-valued channel coefficient $h_{34}$ represents the effective channel involving the physical channel between transmit antenna 160 4 and receive antenna 170 3, the complex-valued channel coefficient $h_{43}$ represents the effective channel involving the physical channel between transmit antenna 160 3 and receive antenna 170 4, and the complex-valued channel coefficient $h_{44}$ represents the effective channel involving the physical channel between transmit antenna 160 4 and receive antenna 170 4.

The general meaning of a block diagonal effective channel matrix is that it tends to have the structure $$H = \begin{bmatrix} H^{(1)}_{\tilde{M}_2 \times \tilde{L}_1} & Z_{\tilde{M}_1 \times \tilde{L}_2} & \cdots & Z_{\tilde{M}_1 \times \tilde{L}_K} \\ Z_{\tilde{M}_2 \times \tilde{L}_1} & H^{(2)}_{\tilde{M}_2 \times \tilde{L}_2} & \vdots & \vdots \\ \vdots & \cdots & \ddots & Z_{\tilde{M}_{K-1} \times \tilde{L}_K} \\ Z_{\tilde{M}_K \times \tilde{L}_1} & \cdots & Z_{\tilde{M}_K \times \tilde{L}_{k-1}} & H^{(K)}_{\tilde{M}_K \times \tilde{L}_K} \end{bmatrix}$$

where the matrix can be subdivided into off-diagonal $\tilde{M}_k \times \tilde{L}_k$, blocks $Z_{\tilde{M}_1 \times \tilde{L}_2}$, k=1, 2, ..., K≠1, 2, ..., K and on-diagonal $\tilde{M}_k \times \tilde{L}_k$, blocks $H^{(k)}_{\tilde{M}_k \times \tilde{L}_k}$, k=1, 2, ..., K of possibly varying sizes. The effective channel is defined to be block diagonal if it can be rearranged by means of appropriate row and column permutations to have a form as above such that the average powers (as averaged over sufficiently long time-period so that the fast fading is averaged out) of the channel coefficients in the off-diagonal blocks $Z_{\tilde{M}_1 \times \tilde{L}_2}$ are significantly lower than the average powers of the channel coefficients in the on-diagonal blocks $H^{(k)}_{\tilde{M}_k \times \tilde{L}_k}$. Such significantly lower power would e.g occur if a cross-polarized antenna setup is used in the first node 100 and a similar cross-polarized antenna setup is used in the second node 120. The difference in average power between channel coefficients on the block diagonal and off the block diagonal is often, depending on the propagation scenario, around 6 dB or substantially higher. Even if the antenna setup used in the second node 120 is not exactly cross-polarized, the power differences may still be significant. The effective channel is referred to as intentionally block diagonal if the antenna setup is arranged such that it is possible to obtain a block diagonal effective channel as defined above without using any processing in the post pre-coding unit 163 and the pre-processing unit 171 that tracks the instantaneous spatial properties (i.e. properties introduced by fast fading) of the physical channels. One example of when such an intentionally block diagonal effective channel arises was given previously herein for the 4×4 case, where two horizontally and two vertically polarized antennas were used for the transmission in the first node and similarly for the corresponding reception in the second node and where the post pre-coding unit 163 and the pre-processing unit 171 are both transparent.

Precoding Matrix Having a Block Diagonal Structure.

The first node 100 determines a precoding matrix having a block diagonal structure. The determined precoding matrix is to be used for precoding the at least one symbol stream (i.e., one or more layers) to be transmitted to the second node 120. The determination may be performed by choosing the precoding matrix to match the characteristics of the effective channel modelled as the effective channel matrix H. The advantage by using a precoding matrix having a block diagonal structure for precoding is that when the effective channel matrix is block diagonal, the use of the precoding matrix having a block diagonal structure adapts the transmission to the block diagonal effective channel matrix. It also works well to use a precoding matrix having a block diagonal structure in cases when effective channel matrix is not block diagonal, the performance might however be better with another precoder structure. In any case, for these latter cases, the transmission will be adapted to the non-block diagonal effective channel matrix.

Codebook

In some embodiments the first node 100 comprises a codebook 180. In some embodiments the second node 120 comprises a code book 190. The first node 100 may perform the determination by selecting the precoding matrix having a block diagonal structure from a codebook comprised in the first node 100 or receive from the second node 120 a recommended precoding matrix having a block diagonal structure from a codebook comprised in the second node 120. The codebook 180, 190 comprises precoding matrices where each precoding matrix may correspond to different multiple transmission modes or forms of spatial processing, e.g., channel dependent precoding, MIMO precoding, SDMA, SDMA with precoding, MIMO-SDMA, etc. Such information may be pre-defined. The codebook 180, 190 may further in addition to precoder matrices/vectors comprise many other parameters such as, transmission ranks, modulation choices, transport block sizes, powers and/or channelization codes etc. In some embodiments the codebook comprises a precoder where the transmission rank is implicitly given by the size of the precoder matrix. The codebook 180, 190 is suitable for a block diagonal effective channel matrix in that the codebook 180, 190 comprises one or more precoding matrices having a block diagonal structure. Such a block diagonal channel matrix might for example arise in an antenna setup where both the first node 100 and the second node 120 are equipped with cross-polarized antennas, and in particular if the polarizations of the antennas are vertically and horizontally oriented as mentioned above. The codebook 180, 190 may further comprise precoding matrices having a non-block diagonal structure. However, according to the present method, the first node 100 or second node is free to select a precoding matrix having a block diagonal structure from the codebook. In some embodiments the codebook is designed such that it does not waste precoding matrices, also called codebook elements, on quantizing channel coefficients which are zero (in practice they will be non-zero or relatively small in comparison with the channel coefficients on the block diagonal) and, for some transmission ranks, not wasting transmission power on those near-zero elements.

The codebooks 180 and 190 may be known a priori by both the first node 100 and the second node 120. The transmitter in the first node 100 may, for example, notify the receiver in the second node 120 of its codebook 180. A suitable codebook structure will also in some sense be block diagonal. One example of such a block diagonal codebook C is given in Table 1.

TABLE 1

Example of a codebook C
with precoder matrices having a block diagonal structure.

| Tx Rank r | Codebook per Rank |
|---|---|
| 1 | $\begin{bmatrix} v_l \\ 0 \\ 0 \end{bmatrix} \cdot l = 0 \cdot \ldots, 5, \begin{bmatrix} 0 \\ 0 \\ v_{l'} \end{bmatrix}, l' = 0, \ldots, 5,$ where $v_l \in \left\{ \begin{bmatrix} 1 \\ 0 \end{bmatrix}, \begin{bmatrix} 0 \\ 1 \end{bmatrix}, \begin{bmatrix} 1 \\ \exp(j2\pi k/4) \end{bmatrix} \right\} \cdot k = 0 \cdot \ldots, 3 \right\}$ |
| 2 | $\begin{bmatrix} v_l & 0 \\ & 0 \\ 0 & v_{l'} \\ & 0 \end{bmatrix} \cdot l = 0, \ldots, 5, l' = 0, \ldots \cdot 5$ |
| 3 | $\begin{bmatrix} v_l & 0 & 0 \\ & 0 & 0 \\ 0 & 1 & 0 \\ 0 & 0 & 1 \end{bmatrix} \cdot l = 0, \ldots, 5, \begin{bmatrix} 1 & 0 & 0 \\ 0 & 1 & 0 \\ 0 & 0 & v_{l'} \\ 0 & 0 & \end{bmatrix}, l' = 0, \ldots \cdot 5$ |
| 4 | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

As seen from Table 1, there are separate precoder matrices for each of the four possible transmission ranks (Tx Rank) r. In Table 1, $v_l$ may for example belong to the set of vectors displayed under the rank one row and as seen contain four vectors suitable for beam forming (the four last in the set).

Table 1 relates to a codebook structure suitable for a block diagonal effective MIMO channel, which may for example arise when two spatially separated cross polarized antenna pairs (large inter-pair distance, further optimizations can be done if distance is small) are used in both the first node 100 and the second node 120 in conjunction with for example a Single User MIMO (SU-MIMO) kind of transmission. Multi-user MIMO (MU-MIMO) is obviously also possible since several individual links in MU-MIMO can for the purpose herein be viewed together as a single MIMO link. For notational simplicity, the scaling of the matrices, needed so as to keep the total transmission power constant regardless of the selected precoding matrix, has intentionally been left out in the table.

Thus a precoder matrix $W_{N_T \times r}$ to use for the transmission is selected among the matrices given in the exemplified codebook C. It should be noted that it is essentially the placement of zeros in the codebook that is the important part of the structure. A block diagonal precoder matrix $W_{N_T \times r}$ can in general be written as $$W = \begin{bmatrix} W^{(1)}_{M_1 \times L_1} & 0_{M_1 \times L_2} & \cdots & 0_{M_1 \times L_K} \\ 0_{M_2 \times L_1} & W^{(2)}_{M_2 \times L_2} & \vdots & \vdots \\ \vdots & \cdots & \ddots & 0_{M_{K-1} \times L_K} \\ 0_{M_K \times L_1} & \cdots & 0_{M_K \times L_{K-1}} & W^{(K)}_{M_K \times L_K} \end{bmatrix}$$

where as seen only the $M_k \times L_k$ blocks $W^{(k)}_{M_k \times L_k}$, k=1, 2 ... K of possibly varying sizes on the diagonal (in the block domain) may contain non-zero elements. A precoder matrix is considered block diagonal if its columns and rows can be permuted so as to achieve the above form. The rank three case in Table 1 shows an example where the six first precoder matrices have the structure $$W = \begin{bmatrix} W^{(1)}_{2 \times 1} & 0_{2 \times 2} \\ 0_{2 \times 1} & W^{(2)}_{2 \times 2} \end{bmatrix}$$

and thus the block sizes vary in order to support the rank adaptation which in this case dictates three columns in the precoder matrices. Also note that a block may be of size 1×1. Thus, the identity matrix for rank 4 can also be considered to have a block diagonal structure.

Considering the exact values of the non-zero elements, one possibility is to design and/or select the precoder independently on the two polarizations but a joint design selection may be advantageous, (just as vector quantization is better than scalar quantization or a an algorithm attempting to jointly solve multiple connected problems has potential to perform better than separately solving the different problems). It should be noted that the block diagonal structure of the intentionally block diagonal effective channel carries over to a somewhat similar block diagonal structure of the precoder matrices—similar in the sense that the number of rows $M_k$ in each block $W^{(k)}_{M_k \times L_k}$, of the precoder matrix equals the number of columns $\tilde{L}_k$ in the corresponding block $H^{(1)}_{\tilde{M}_1 \times \tilde{L}_1}$ of the intentionally block diagonal effective channel, whereas the number of columns $L_k$ may be different as exemplified for rank three above. It should also be noted that the precoder elements in the codebook vary from one transmission rank to another.

This block diagonal precoder structure is easily generalized to any number of transmit and receive antennas as illustrated above and is suitable for intentionally block diagonal effective channel matrices, that may arise for example when the antennas at the transmitter may be grouped into co-polarized and cross-polarized sets (e.g. horizontal and vertical polarizations) and similarly for the receiver. Permutations of the rows and columns of the precoder matrices should not be seen as a different structure just as reordering of the antennas or layers may be done without loss of generality. Any system whose effective channel matrix may be written on a block diagonal form may benefit from such a codebook structure. A codebook may also contain additional precoder elements that are not block diagonal. This may be beneficial for matching the precoder to effective channel realizations that e.g. momentarily are rather far from being block diagonal.

Figure 4:
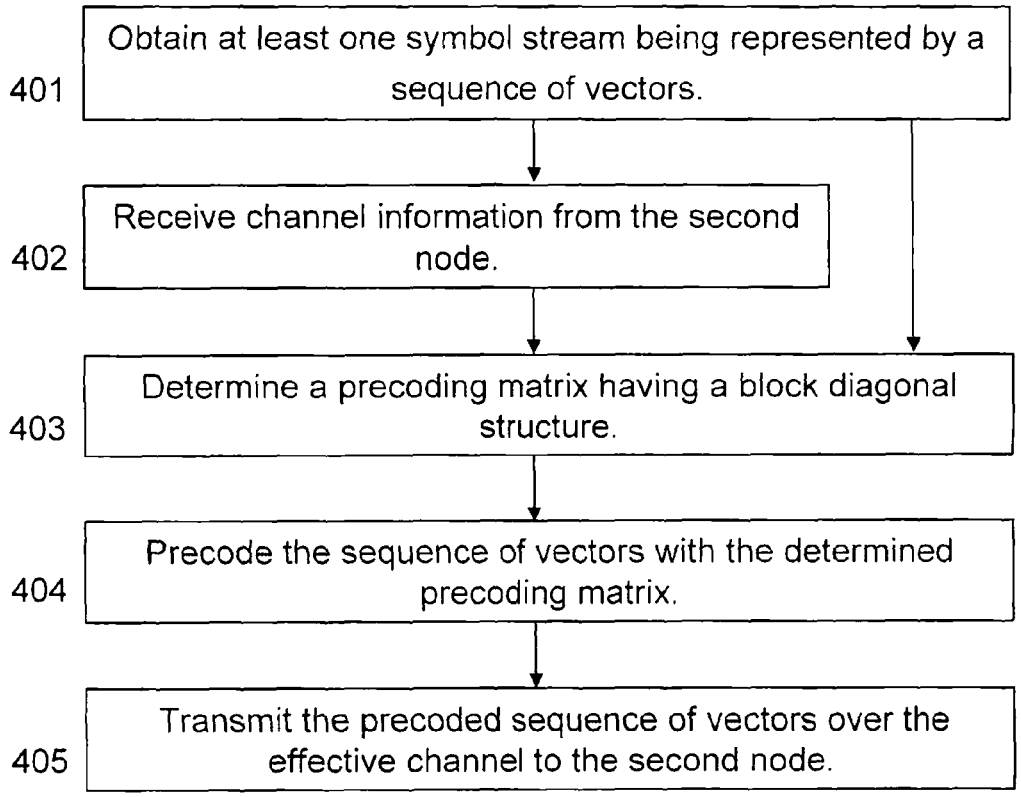
FIG. 4 is a flow chart illustrating embodiments of a method in a first node.

The method steps in the first node 100 for adapting a multi-antenna transmission to the second node 120 over an effective channel according to some embodiments will now be described with reference to a flowchart depicted in FIG. 4. The effective channel has multiple inputs and at least one output, corresponding to e.g. multiple transmit antennas in the first node 100 and at least one receive antenna in the second node 120. As is evident from the data model described above, the effective channel H comprises not only the physical channel but also the effects of any additional processing subsequent to the precoder operation in the transmitter of the first node 100, e.g. transmit filters. Similarly, the effective channel may also include parts of the receiver in the second node 120, e.g. receive filters. In some embodiments the transmission is adapted to a block diagonal effective channel. The method is applicable for adapting transmissions over any effective channel matrix. In the embodiments wherein an intentionally block diagonal effective channel matrix is used, the transmission is adapted to the intentionally block diagonal effective channel matrix. This is highly advantageous because 1) transmission energy is not wasted on inputs of the intentionally block diagonal effective channel which are not useful to the receiver in the second node, 2) the transmission is such that it does not mix the symbol streams/layers which otherwise would be well-separated by the intentionally block diagonal effective channel.

In some embodiments the first node 100 comprises a multi-antenna system with antenna set-up of cross-polarized antennas being used for wireless communication with the second node 120, where the second node 120 is also using a cross-polarized antenna setup for the reception of the signals transmitted from the first node 100

The cross-polarized antenna set-up results in an intentionally block diagonal effective channel matrix. One particular example of when this occurs is if the two orthogonal polarization directions used in the first node 100 matches the two polarization directions in the second node 120, such as e.g. if two pairs of horizontally and vertically polarized antennas are used in the first as well as in the second node.

The effective channel may comprise processing steps subsequent to the precoding operation in addition to the physical channel and possible processing steps in the second node 120, e.g. transmit and receive filters. In some embodiments the number of outputs of the effective channel is at least two. The method comprising the steps of:

401. The first node obtains at least one symbol stream. The symbol stream is intended to be transmitted to the second node 120 over the effective channel. In some embodiments the effective channel comprises more than two inputs. In this case this step is involves performing transmission rank adaptation in the sense of selecting the number of symbol streams to match the characteristics of the effective channel.

402. This step is optional. In some embodiments the first node 100 receives channel information from the second node 120. Channel information is in general a quantity which is statistically related to the effective channel. Examples of channel information includes channel estimates, quantized channel estimates, precoder recommendations etc. In particular, the received channel information may be a precoding matrix that the second node 120 has recommended the first node 100 to use. In some embodiments the channel information comprises channel estimates that can be used by the first node 100 for determining a suitable precoder matrix for the transmission.

403. In this step the first node 100 determines a precoding matrix having a block diagonal structure.

In some embodiments this step is performed based on maximising predicted throughput in the step of transmission by determining a precoder matrix that maximizes the predicted throughput or a related measure, e.g. selecting the, in this sense, best precoder matrix from the codebook. This serves to improve also the actual throughput/performance of the system.

In some further embodiments this step may be performed based on maximising the Signal to Noise Ratio that the second node 120 will see when receiving the transmission from the first node 100. This way of improving the Signal to Noise Ratio also serves to improve the overall performance of the system and may ultimately be exploited for increasing the throughput In some embodiments the first node comprises a code book. In this case this step may be performed by selecting the precoding matrix from the code book.

The codebook may comprise separate precoding matrices for each of the respective possible transmission ranks as can be seen from e.g. Table 1. In some embodiments, for each transmission rank, a majority of the precoder matrices are block diagonal in the codebook 180.

This step of determining the precoding matrix may also be performed by basing the determination on measurements carried out in the a reverse link, i.e. measurements in the first node 100 of received signals originating from transmissions from the second node 120, and/or exploiting channel reciprocity properties. Channel reciprocity means that the channel, or certain properties of the channel, is similar in the forward (from first node 100 to second node 120) and reverse (from second node 120 to first node 100) links. The measurements on a reverse link may comprise a channel estimate.

In some embodiments the first node 100 has received channel information from the second node 120 in the optional step 402. In these embodiments this step of determining the precoding matrix is performed based on the channel information received from the second node 120.

404. The first node 100 precodes the at least one symbol stream with the determined precoding matrix.

405. The first node 100 then transmits the at least one precoded symbol stream over the effective channel to the second node 120. In some embodiments the transmission of the precoded at least one symbol stream in the first node 100 is conducted using a multi-antenna system with a cross-polarized antenna set-up and the reception of the precoded at least one symbol stream in the second node 120 is carried out via the use of a multi-antenna system, which multi-antenna systems result in an intentionally block diagonal effective channel matrix.

To perform the method steps above, the first node 100 comprises an arrangement 500 depicted in FIG. 5. As mentioned above, the first node 100 and the second node 120 are comprised in the wireless communication system 110.

The first node 100 is arranged to adapt a transmission to the second node 120 over an effective channel. The effective channel has multiple inputs and at least one output. In some embodiments the number of outputs of the effective channel is at least two.

The first node arrangement 500 comprises an obtaining unit 510 configured to obtain at least one symbol stream. In some embodiments the effective channel comprises more than two inputs. In this case the obtaining unit 510 further is configured to involve performing transmission rank adaptation in the sense of selecting the number of symbol streams to match the characteristics of the effective channel.

The first node arrangement 500 comprises a determination unit 520 configured to determining a precoding matrix having a block diagonal structure.

In some embodiments the determination unit 520 further is configured to base the determination of the precoding matrix on maximising of a predicted throughput of the transmission.

In some embodiments the determination unit 520 further is configured to base the determination of the precoding matrix on maximising of the Signal to Noise Ratio that the second node 120 will experience when receiving the transmission from the first node 100.

The determination unit 520 may further be configured to base the determination of the precoding matrix on maximising of the Signal to Noise Ratio that the second node 120 will receive when performing a transmission.

In some embodiments the determination unit 520 further is configured to select the precoding matrix from a code book 180. In some embodiments the codebook comprises separate precoding matrices for each of the respective possible transmission ranks. In some embodiments, for each transmission rank, a majority of the precoder matrices are block diagonal in the codebook 180.

In some embodiments, the determination unit 520 further is configured to base the determination on measurements on a reverse link and/or exploiting channel reciprocity properties. The measurements on a reverse link may comprise a channel estimate.

The first node arrangement 500 further comprises a precoding unit 300 configured to precode the at least one symbol stream with the determined precoding matrix.

The first node arrangement 500 also comprises a transmission unit 540 configured to transmit the precoded at least one symbol stream over the effective channel to the second node 120.

The first node arrangement 500 may comprise a receiving unit 550 configured to receive channel information from the second node 120.

The determination unit 520 may further be configured to determine the precoding matrix based on the channel information received from the second node 120.

The received channel information may be a recommended precoding matrix. In some embodiments the channel information comprises a channel estimate.

In some embodiments the transmitted at least one precoded symbol stream is adapted to a block diagonal effective channel.

In some embodiments transmission of the precoded at least one symbol stream in the first node 100 is arranged to be conducted using a multi-antenna system with a cross-polarized antenna set-up comprised in the first node 100, and wherein the reception of the precoded at least one symbol streams in the second node 120 is arranged to be carried out via the use of a multi-antenna system comprised in the second node 120, which multi-antenna systems result in an intentionally block diagonal effective channel.

The method steps in the second node 120 for adapting a multi-antenna transmission from a first node to a second node 120 over an effective channel in a wireless communication system 110 according to some embodiments will now be described with reference to a flowchart depicted in FIG. 6. The effective channel has multiple inputs and at least one output. In some embodiments the transmission is adapted to a block diagonal effective channel.

In some embodiments the second node 120 comprises a multi-antenna system with antenna set-up of cross-polarized antennas being used for wireless communication with the first node 100, where the first node 100 is also using a cross-polarized antenna setup for the transmission of the signals received by the second node 120. The cross-polarized antenna set-up results in an intentionally block diagonal effective channel. One particular example of when this occurs is if the two orthogonal polarization directions used in the first node 100 matches the two polarization directions in the second node 120, such as e.g. if two pairs of horizontally and vertically polarized antennas are used in the first as well as in the second node The method comprises the steps of:

601. The second node 120 selects a precoding matrix having a block diagonal structure.

In some embodiments this step is performed based on maximising a predicted throughput in the step of receiving the transmission of the at least one precoded symbol stream from the first node 100.

This step may also be performed based on maximising the Signal to Noise Ratio that the second node 120 will receive in the step 603 of receiving the at least one precoded symbol stream from the first node 100.

This step may also be performed based on maximising the Signal to Noise Ratio that the second node 120 will receive in the next step 502 of receiving the at least one precoded symbol stream from the first node 100.

In some embodiments this step may be performed by optimizing a performance related criterion function over a feasible set of precoder matrices. The precoder matrix giving the highest performance, as measured by the performance related criterion function, would then be selected in order to improve the actual performance.

In some embodiments this step is performed by selecting the precoding matrix from a code book. This may be performed in the same way as in the method of the first node 100 described above.

In some embodiments the codebook comprises separate precoding matrices for each of the respective possible transmission ranks. This may also be performed in the same way as in the method of the first node 100 described above.

In some embodiments, for each transmission rank, a majority of the precoder matrices are block diagonal in the codebook 180.

602. In this step the second node 120 conveys the selected precoding matrix to the first node 120.

603. The second node 120 then receives the at least one precoded symbol stream over the effective channel conveyed from the first node 100. The received at least one symbol stream is precoded with the determined precoding matrix in the first node 100.

As mentioned above, the transmission of the precoded at least one symbol stream in the first node 100 may be conducted using a multi-antenna system with a cross-polarized antenna set-up and the reception of the precoded at least one symbol stream in the second node 120 may be carried out via the use of a multi-antenna system, which multi-antenna systems result in an intentionally block diagonal effective channel matrix.

To perform the method steps above, the second node 120 comprises an arrangement 700 depicted in FIG. 7. As mentioned above, the second node 120 is arranged to receive a multi-antenna transmission from a first node 100 over an effective channel. The effective channel has multiple inputs and at least one output. The first node 100 and the second node 120 are comprised in the wireless communication system 110.

The second node arrangement 700 comprises a selecting unit 710 configured to select a precoding matrix having a block diagonal structure.

The selecting unit 710 may further be configured to base the selection of the precoding matrix on maximising of a predicted throughput of the transmission of the received at least one precoded symbol stream from the first node 100.

In some embodiments the selecting unit 710 is configured to base the selection of the precoding matrix on maximising of the Signal to Noise Ratio that the second node 120 will receive when receiving the at least one precoded symbol stream from the first node 100.

The selecting unit 710 may further be configured to select the precoding matrix from a codebook 190. In some embodiments the codebook comprises separate precoding matrices for each of the respective possible transmission ranks. The codebook 190 may comprise a separate precoding matrix for each of the respective possible transmission ranks. In some embodiments, for each transmission rank, a majority of the precoder matrices are block diagonal in the codebook 180.

In some embodiments the selecting unit 710 further is configured to optimize a performance related criterion function over a feasible set of precoder matrices.

The second node arrangement 700 further comprises a conveying unit 720 configured to convey the selected precoding matrix to the first node 100.

The second node arrangement 700 further comprises a receiving unit 730 configured to receive at least one precoded symbol stream over the effective channel transmitted from the first node 100. The received at least one symbol stream is precoded with the determined precoding matrix in the first node 100.

In some embodiments, the transmitted at least one precoded symbol stream is adapted to a block diagonal effective channel matrix.

In some embodiments transmission of the precoded at least one symbol stream in the first node 100 is arranged to be conducted using a multi-antenna system with a cross-polarized antenna set-up comprised in the first node 100, wherein the reception of the precoded at least one symbol streams in the second node 120 is arranged to be carried out via the use of a multi-antenna system comprised in the second node 120, which multi-antenna systems result in an intentionally block diagonal effective channel matrix.

Some embodiments of the present method may be described in the following general way. A method comprising determining at least one codebook element corresponding to a beam forming matrix in a MIMO transmitter having N×N antennas. The antennas being grouped into cross-polarized sets of antennas. The method comprising selecting a precoding channel matrix having a block-diagonal structure.

Precoding for multi-antenna systems can more generally be described as multiplying a vector-valued information-carrying signal with a precoder matrix, which vector-valued information-carrying signal in this document is termed a symbol stream or symbols streams. The latter may alternatively be referred to as layer or layers, respectively.

The present mechanism for adapting a transmission from a first node 100 to a second node 120 over an effective channel may be implemented through one or more processors, such as a processor 560 in the first node arrangement 500 depicted in FIG. 5 or the processor 740 in the second node arrangement 700 depicted in FIG. 7, together with computer program code for performing the functions of the present solution. The program code mentioned above may also be provided as a computer program product, for instance in the form of a data carrier carrying computer program code for performing the present solution when being loaded into the first node 100 or the second node 120. One such carrier may be in the form of a CD ROM disc. It is however feasible with other data carriers such as a memory stick. The computer program code can furthermore be provided as pure program code on a server and downloaded to first node 100 or second node 120 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appended claims.

The invention claimed is:

1. A method in a first node for adapting a multi-antenna transmission to a second node over an effective channel, the effective channel having multiple inputs and at least one output, the first node and the second node being included in a wireless communication system, the method comprising the steps of:
    obtaining at least one symbol stream;
    determining a precoding matrix, wherein the precoding matrix matches the effective channel which is block diagonal and the precoding matrix has a corresponding block diagonal structure;
    precoding the at least one symbol stream with the determined precoding matrix to improve radio link performance of the effective channel; and
    transmitting the precoded at least one symbol stream over the effective channel to the second node.

2. The method according to claim 1, wherein the step of obtaining at least one symbol stream involves performing transmission rank adaptation in the sense of selecting the number of symbol streams to match the characteristics of the effective channel.

3. The method according to claim 1, wherein the number of outputs of the effective channel is at least two.

4. The method according to claim 1, wherein the transmission is adapted to the block diagonal effective channel.

5. The method according to claim 1, wherein the effective channel is intentionally block-diagonal and wherein the transmission is adapted to the intentionally block diagonal effective channel.

6. The method according to claim 1, wherein the transmission of the precoded at least one symbol stream in the first node is conducted using a multi-antenna system with a cross-polarized antenna set-up, and reception of the precoded at least one symbol stream in the second node is carried out via the use of a multi-antenna system, wherein the multi-antenna system results in an intentionally block diagonal effective channel matrix.

7. The method according to claim 1, wherein the determining of the precoding matrix is performed based on maximizing a predicted throughput during transmission of the precoded at least one symbol stream over the effective channel.

8. The method according to claim 1, wherein the step of determining the precoding matrix is based on maximizing the Signal to Noise Ratio that the second node will receive during transmission of the precoded at least one symbol stream over the effective channel.

9. The method according to claim 1, wherein the determining of the precoding matrix is performed by selecting the precoding matrix from a code book.

10. The method according to claim 9, wherein the codebook comprises separate precoding matrices for each of respective possible transmission ranks.

11. The method according to claim 10, wherein, for each transmission rank, a majority of the precoder matrices are block diagonal in the codebook.

12. The method according to claim 1, further comprising receiving channel information from the second node, and wherein the determining of the precoding matrix is performed based on the channel information received from the second node.

13. A method in a second node for assisting a first node in the adaptation of a multi-antenna transmission from the first node to the second node over an effective channel, the effective channel having multiple inputs and at least one output, the first node and the second node being included in a wireless communication system, the method comprising the steps of:
- selecting a precoding matrix to match the effective channel, wherein the effective channel is block diagonal and the precoding matrix has a corresponding block diagonal structure;
- conveying the selected precoding matrix to the first node; and
- receiving at least one precoded symbol stream over the effective channel transmitted from the first node, wherein the received symbol stream is precoded with the selected precoding matrix in the first node.

14. The method according to claim 13, wherein the transmission is adapted to the block diagonal effective channel.

15. The method according to claim 13, wherein the effective channel is intentionally block-diagonal and wherein the transmission is adapted to the intentionally block diagonal effective channel.

16. The method according to claim 13, wherein the transmission of the at least one precoded symbol stream from the first node is conducted using a multi-antenna system with a cross-polarized antenna set-up and the reception of the at least one precoded symbol stream in the second node is carried out via the use of a multi-antenna system, wherein the multi-antenna system results in an intentionally block diagonal effective channel matrix.

17. The method according to claim 13, wherein the selecting of a precoding matrix is performed based on maximizing a predicted throughput during receiving the at least one precoded symbol stream from the first node.

18. The method according to claim 13, wherein the selecting of a precoding matrix is performed based on maximizing the Signal to Noise Ratio that the second node will receive when receiving the at least one precoded symbol stream from the first node.

19. The method according to claim 13, wherein the precoding matrix is selected from a code book.

20. The method according to claim 19, wherein the codebook comprises separate precoding matrices for each of respective possible transmission ranks.

21. The method according to claim 20, wherein, for each transmission rank, a majority of the precoder matrices are block diagonal in the codebook.

22. The method according to claim 13, wherein the selecting of a precoding matrix is performed by optimizing a performance related criterion function over a feasible set of precoder matrices.

23. A first node, the first node being arranged to adapt a multi-antenna transmission to a second node over an effective channel, the effective channel having multiple inputs and at least one output, the first node and the second node being comprised in a wireless communication system, the first node comprising:
- an obtaining unit configured to obtain at least one symbol stream;
- a determination unit configured to determine a precoding matrix, wherein the precoding matrix matches the effective channel which is block diagonal and the precoding matrix has a corresponding block diagonal structure;
- a precoding unit configured to precode the at least one symbol stream with the determined precoding matrix; and
- a transmission unit configured to transmit the at least one precoded symbol stream over the effective channel to the second node.

24. The first node according to claim 23, wherein the obtaining unit is further configured to involve performing transmission rank adaptation in the sense of selecting the number of symbol streams to match the characteristics of the effective channel.

25. The first node according to claim 23, wherein the number of outputs of the effective channel is at least two.

26. The first node according to claim 23, wherein the transmitted at least one precoded symbol stream is adapted to the block diagonal effective channel.

27. The first node according to claim 23, wherein the effective channel is intentionally block-diagonal and wherein the transmission is adapted to the intentionally block diagonal effective channel.

28. The first node according to claim 23, wherein transmission of the at least one precoded symbol stream in the first node is arranged to be conducted using a multi-antenna system with a cross-polarized antenna set-up comprised in the first node, and wherein reception of the at least one precoded symbol stream in the second node is arranged to be carried out via the use of a multi-antenna system comprised in the second node, wherein the multi-antenna system results in an intentionally block diagonal effective channel matrix.

29. The first node according to claim 23, wherein the determination unit is further configured to base the determination of the precoding matrix on maximizing a predicted throughput of the transmission.

30. The first node according to claim 23, wherein the determination unit is further configured to base the determination of the precoding matrix on maximizing the Signal to Noise Ratio that the second node will receive when performing a transmission.

31. The first node according to claim 23, wherein the determination unit is further configured to select the precoding matrix from a code book.

32. The first node according to claim 31, wherein the codebook comprises separate precoding matrices for each of respective possible transmission ranks.

33. The first node according to claim 32, wherein, for each transmission rank, a majority of the precoder matrices are block diagonal in the codebook.

34. The first node according to claim 23, further comprising:
- a receiving unit configured to receive channel information from the second node; and
- wherein the determination unit is further configured to determine the precoding matrix based on the channel information received from the second node.

35. A second node, arranged to receive a multi-antenna transmission from a first node over an effective channel, the effective channel having multiple inputs and at least one output, the first node and the second node being included in a wireless communication system, the second node comprising:

a selecting unit configured to select a precoding matrix to match the effective channel, wherein the effective channel is block diagonal and the precoding matrix has a corresponding block diagonal structure;

a conveying unit configured to convey the selected precoding matrix to the first node; and a receiving unit configured to receive at least one precoded symbol stream over the effective channel transmitted from the first node, wherein the received at least one precoded symbol stream is precoded with the selected precoding matrix in the first node.

36. The second node according to claim 35, wherein the transmitted at least one precoded symbol stream is adapted to the block diagonal effective channel.

37. The second node according to claim 35, wherein the effective channel is intentionally block-diagonal and wherein the transmission is adapted to an intentionally block diagonal effective channel.

38. The second node according to claim 35, wherein transmission of the at least one precoded symbol stream in the first node is arranged to be conducted using a multi-antenna system with a cross-polarized antenna set-up comprised in the first node, and wherein the reception of the at least one precoded symbol stream in the second node is arranged to be carried out via the use of a multi-antenna system comprised in the second node, wherein the multi-antenna system results in an intentionally block diagonal effective channel matrix.

39. The second node according to claim 35, wherein the selecting unit is further configured to base the selection of the precoding matrix on maximizing a predicted throughput of the transmission of the received at least one precoded symbol stream from the first node.

40. The second node according to claim 35, wherein the selecting unit is further configured to base the selection of the precoding matrix on maximizing the Signal to Noise Ratio that the second node will receive when receiving the at least one precoded symbol stream from the first node.

41. The second node according to claim 35, wherein the selecting unit is further configured to select the precoding matrix from a code book.

42. The second node according to claim 41, wherein the codebook comprises separate precoding matrices for each of respective possible transmission ranks.

43. The second node according to claim 42, wherein, for each transmission rank, a majority of the precoder matrices are block diagonal in the codebook.

44. The second node according to claim 35, wherein the selecting unit is further configured to optimize a performance related criterion function over a feasible set of precoder matrices.

* * * * *

UNITED STATES PATENT AND TRADEMARK OFFICE
CERTIFICATE OF CORRECTION

PATENT NO. : 8,644,415 B2
APPLICATION NO. : 12/522863
DATED : February 4, 2014
INVENTOR(S) : Jongren et al.

It is certified that error appears in the above-identified patent and that said Letters Patent is hereby corrected as shown below:

In the Specification

In Column 3, Line 22, delete "a over an" and insert -- over an --, therefor.

In Column 4, Line 61, delete "130" and insert -- 130. --, therefor.

In Column 5, Line 32, delete "1701," and insert -- 170 1, --, therefor.

In Column 11, Line 55, delete "step is involves" and insert -- step involves --, therefor.

In Column 12, Line 19, delete "throughput" and insert -- throughput. --, therefor.

In Column 14, Line 49, delete "first node 120." and insert -- first node 100. --, therefor.

Signed and Sealed this
Twenty-second Day of July, 2014

Michelle K. Lee
*Deputy Director of the United States Patent and Trademark Office*